J. CROWLEY.
DUMP CART.
APPLICATION FILED APR. 29, 1914.
1,166,444.
Patented Jan. 4, 1916.
2 SHEETS—SHEET 1.
Fig. 1.
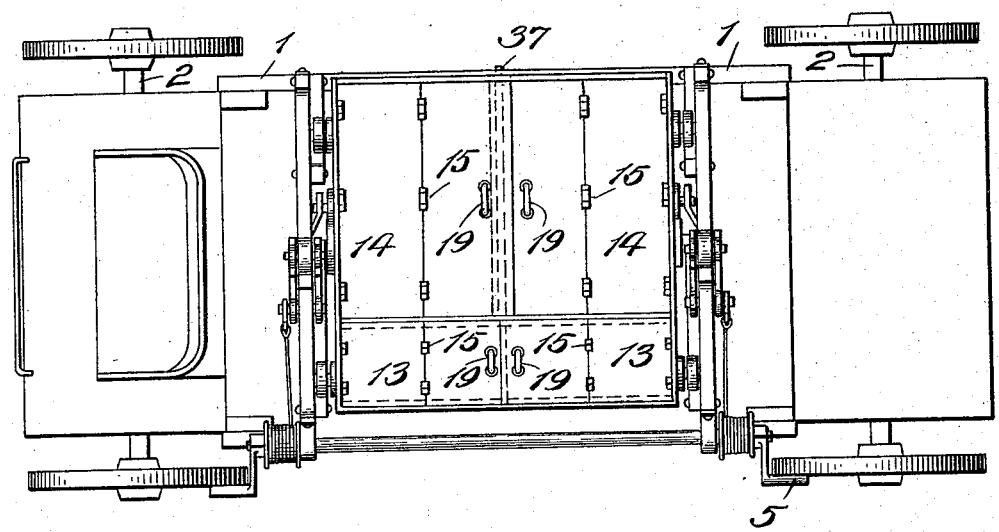
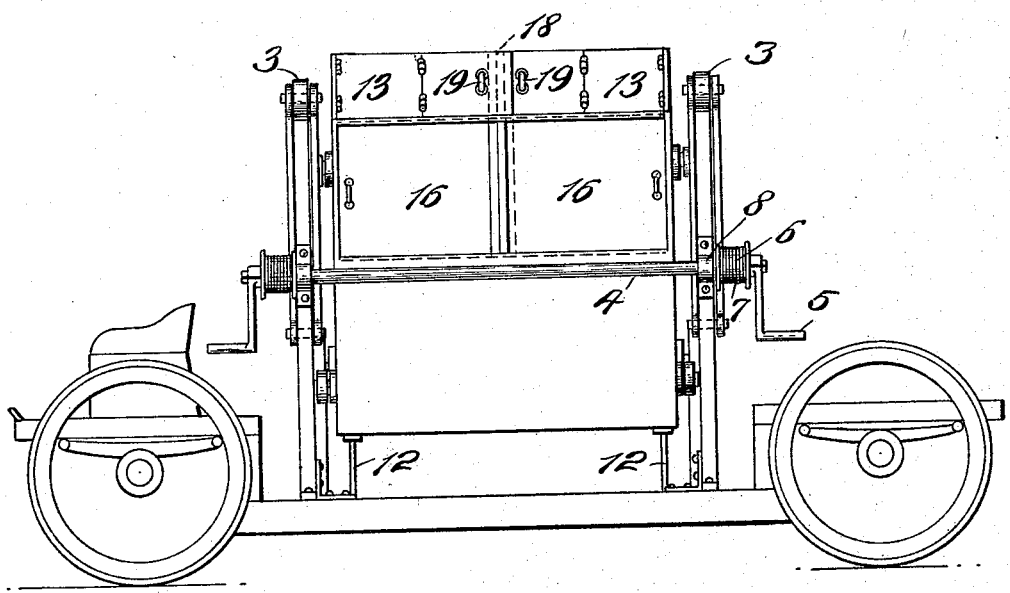
Fig. 2.
Witnesses:
Jeremiah Crowley Inventor
By his Attorney
Isaac B. Owens

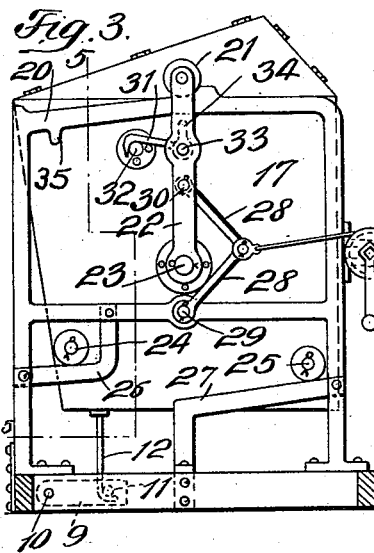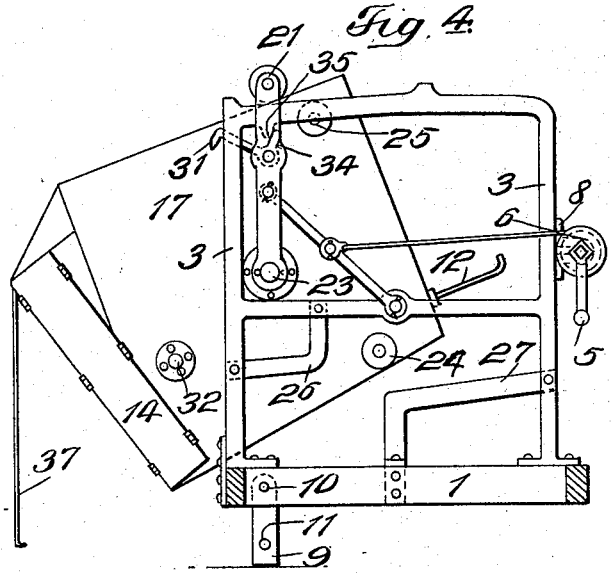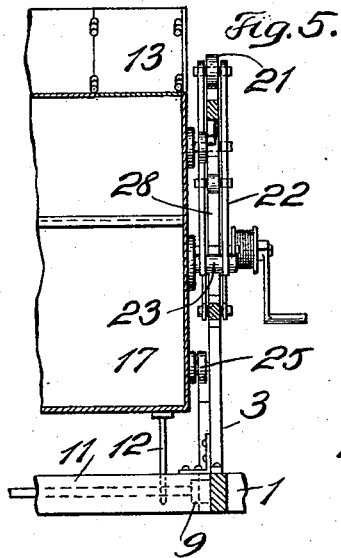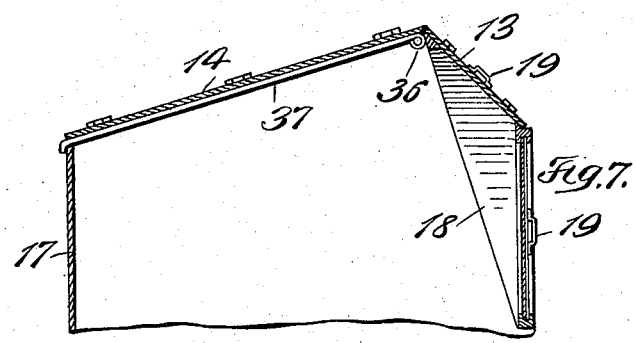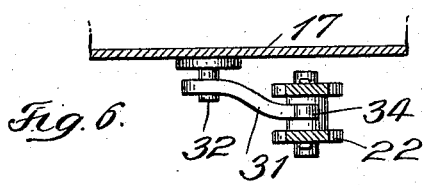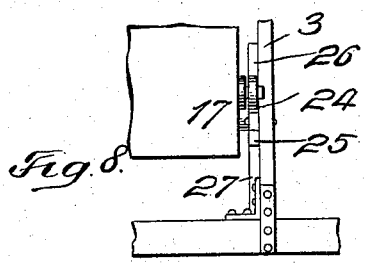

UNITED STATES PATENT OFFICE.

JEREMIAH CROWLEY, OF NEW YORK, N. Y.

DUMP-CART.

1,166,444.  Specification of Letters Patent.  Patented Jan. 4, 1916.

Continuation of application Serial No. 680,726, filed February 29, 1912. This application filed April 29, 1914. Serial No. 835,067.

*To all whom it may concern:*

Be it known that I, JEREMIAH CROWLEY, a citizen of the United States, and resident of the city of New York, borough of Manhattan, county and State of New York, have invented certain new and useful Improvements in Dump-Carts, of which the following is a full, clear, and exact description.

My invention relates to certain improvements in dump carts and more particularly to that type of cart which is commonly called self-dumping.

It has for its principal object the provision of means for dumping the contents free from the wheels and body of the cart which is particularly desirable when said contents are to be dumped in a place inaccessible for the wagon.

This and other objects will appear more fully hereinafter and be particularly pointed out in the claims.

Reference is now to be had to the accompanying illustrations of my invention and in which drawings—Figure 1 is a plan view of my wagon; Fig. 2 is a side elevation thereof; Fig. 3 is an end elevation showing details of dumping means with body in normal position; Fig. 4 is an end elevation showing body in dumping position; Fig. 5 is a fragmentary sectional view on the line 5—5 of Fig. 3, showing details of windlass; and Figs. 6, 7 and 8 are detail views of certain features of construction.

Referring more specifically to the drawings, the frame 1 of the wagon is carried by axles 2 in the ordinary manner. The uprights 3, with braces forming a substantial frame, are secured to the wagon frame by any suitable means. The shaft 4 is journaled in brackets 8, preferably secured to the uprights 3, and carries rigidly at each end the cranks 5 and drums 6 around which pass chains or ropes 7. Hinged to the base 1 is a folding leg 9 which as shown in Figs. 3, 4 and 5 extends underneath the bucket 17. This leg is pivoted at 10 and its two ends are connected by a rod 11. Attached to the base of the bucket is a hook 12 adapted normally to engage the rod 11 and support the leg 9 free of the ground.

Referring to Fig. 1, the bucket 17 is completely covered at the top by folding doors 13 and 14. 15 indicates hinges on doors 13 and 14 so that they may fold in two when opened. 16 indicates sliding doors on the front of the bucket. A support 18 is placed in the center of one side portion of the bucket to give the parts the necessary strength. Hinged to the support 18 at 36 is a bar 37 adapted to rest on the opposite side of the bucket. This bar 37 supports the doors 14 as shown in detail in Figs. 1 and 7. Suitable handles 19 are fixed to the doors 13 and 14 in any position desired. The two doors 16 are of peculiar construction, as shown in Figs. 2 and 7, *i. e.*, they slide one over the other so that when one door is open the other must be closed.

The bucket is suspended from an inclined track 20 by a roller 21 at the end of arm 22, which is eccentrically and pivotally attached to the body 17 at 23. The rollers 24—25 attached to the body and bearing on inclined tracks 26—27 serve as further supports. The rope 7 is attached at one end to the hinged arm 28, which is pivoted at one end to the frame at 29, the other end being pivoted to arm 22 at point 30. The hook 31 attached to arm 22 at point 33 engages the pin 32 on bucket 17 and holds it upright while the latter is in normal position and until the roller 21 has nearly reached the limit of its travel to the left, when the arm 34 on hook 31 engages a projection 35 on the framework 20, releasing the hook 31 from the stud 32 and allowing the bucket or body 17 to swing to the position shown in Fig. 4, by reason of the eccentric placement of the pivot 23.

In the operation of my improved dumping wagon, one of the sliding doors 16 and the corresponding folding door 13 are moved either to the left or the right and the wagon body is filled to any desired height. When it becomes necessary the other set of doors 16 and 13 are opened and the wagon filled on that side. The wagon being in position to dump, the doors 13 and 14 are raised and folded back on the hinges 15, being held by any suitable means. The tension on the rope 7 is released by the revolution of the drum 6, and the bucket 17 travels to the left by gravity on the inclined tracks 20, 26 and 27, until the portion 34 of the hook 31 engages with the projection 35, whereby the hook is released from the pin 32, and the rollers 24—25 run off the tracks 26—27, leaving the buckets suspended by the arm 22 on the roller 21. The hook 12 releases the rod 11 and the leg or support 9 is lowered to the ground to maintain the frame 1 in equilibrium when the weight of the body is thrown on that side. Meanwhile as the arm 22 is eccentrically attached to the bucket 17, that is, as the center of gravity of the bucket is to the left of the point of support 23, the bucket will dump automatically to the position shown in Fig. 4, the bar 37 swinging out of the way by gravity. To return the body to normal position, the drums 7 are wound up on the drums 6, pulling the bucket to the right by means of arms 28 and 22, and by manual means the bucket is finally brought to its upright position, the hook 31 engaging the pin 32. The leg 9 is lifted manually until the rod 11 is engaged by the hook 12.

By the above means it will be seen that my construction enables the cart to be filled much more quickly on account of the difference in height of the doors 16 and the top of the cart. Instead of the laborer having to cast the contents up over the edge it is necessary only to cast them into the openings left by the doors 16.

It will also be seen that my cart is at all times almost completely inclosed. When it is opened for the purpose of filling only those portions which are still unfilled are exposed to the wind, an advantage of great value in our city. Even when the cart is being dumped it is still inclosed sufficiently to prevent much of the present raising of dust.

It will readily be seen that my wagon possesses many important functions among which may be mentioned the unloading of snow or other material from a river front or dock.

Having thus described my invention, what I claim as new and desire to secure by Letters Patent is:

1. In combination with a wagon frame, a movable body, means for normally retaining the same in an upright position, means for supporting the same, said means including an arm eccentrically and pivotally attached to said body, a trackway, means for controlling the movement of said last-mentioned means on said trackway, whereby said body may be carried to assume a dumping position on the releasing of said retaining means.

2. In combination with a wagon frame, a body movable relatively thereto, arms pivotally and eccentrically attached to said body, means for retaining the latter normally in upright position, means carried by said wagon frame for movably supporting said body, and means for controlling the movement of said body whereby the latter may be permitted to assume a dumping position automatically upon the release of said retaining means.

3. In combination with a wagon frame, a receptacle, arms pivotally and eccentrically attached to said receptacle, an inclined trackway, means carried by said arms in engagement with said trackway for movably supporting said receptacle, releasable means for retaining said receptacle in an upright position, means for controlling the movement of said body and means adapted to release said retaining means whereby said receptacle may automatically assume a dumping position at a predetermined point in its travel.

4. In combination with a wagon frame, a body, arms pivotally and eccentrically attached to said body, rollers carried by said arms, an inclined trackway transverse of said wagon frame, said rollers being in engagement with said trackway to support said body, auxiliary rollers mounted on said body normally in engagement with trackways, means for retaining said body in upright position, comprising a hook pivotally mounted on said arms, adapted to engage with a stud on said body, a projection carried by said first-mentioned trackway for tripping said hook at a predetermined point in the travel of said body, permitting said body to assume a dumping position, whereby the contents are thrown out and away from said wagon frame.

5. In combination with a wagon frame, a body movable relatively thereto, arms pivotally and eccentrically attached to said body, means for retaining the latter normally in upright position, means carried by said wagon frame for movably supporting said body, and means for controlling the movement of said body whereby the latter may be permitted to assume a dumping position automatically upon the release of said retaining means and means pivoted to said wagon frame for maintaining the same in its normal position during the dumping operation.

6. In combination with a wagon frame, a body movable relatively thereto, means for dumping the body at a predetermined point and means on the body co-acting with means on the frame to preserve the equilibrium of the wagon when the body is dumped, said means comprising a leg on the wagon frame and an arm on the body adapted to drop the leg in position when dumping.

In testimony whereof I have hereunto signed my name in the presence of two witnesses.

JEREMIAH CROWLEY.

Witnesses:
 MARTIN BOURKE,
 ISAAC B. OWENS.

Copies of this patent may be obtained for five cents each, by addressing the "Commissioner of Patents, Washington, D. C."